(12) United States Patent
Triano

(10) Patent No.: US 10,943,265 B2
(45) Date of Patent: Mar. 9, 2021

(54) TARGETED USER DIGITAL EMBEDDED ADVERTISING

(71) Applicant: AT&T INTELLECTUAL PROPERTY I, L.P., Atlanta, GA (US)

(72) Inventor: Stephen Francis Triano, Hillsborough, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 283 days.

(21) Appl. No.: 15/458,303

(22) Filed: Mar. 14, 2017

(65) Prior Publication Data

US 2018/0268441 A1 Sep. 20, 2018

(51) Int. Cl.
G06Q 30/02 (2012.01)

(52) U.S. Cl.
CPC ..... *G06Q 30/0269* (2013.01); *G06Q 30/0261* (2013.01); *G06Q 30/0264* (2013.01); *G06Q 30/0273* (2013.01)

(58) Field of Classification Search
CPC .................................................. G06Q 30/0269
USPC ....................................................... 705/14.49
See application file for complete search history.

(56) References Cited

U.S. PATENT DOCUMENTS

| | | | |
|---|---|---|---|
| 6,078,328 A | 6/2000 | Bergeron et al. | |
| 6,507,618 B1 | 1/2003 | Apostolopoulos et al. | |
| 6,968,499 B1 | 11/2005 | Minami et al. | |
| 8,522,273 B2 | 8/2013 | Zenoni et al. | |
| 8,713,600 B2 | 4/2014 | Shkedi | |
| 8,832,736 B2 | 9/2014 | Chin et al. | |
| 8,949,889 B1 * | 2/2015 | Erdmann | G06Q 30/00 725/22 |
| 9,065,979 B2 | 6/2015 | Cohen et al. | |
| 9,213,986 B1 | 12/2015 | Garrett et al. | |
| 9,386,329 B2 | 7/2016 | Koyama et al. | |
| 9,420,353 B1 | 8/2016 | Gargi et al. | |
| 9,460,451 B2 * | 10/2016 | Ruiz | G06Q 30/00 |
| 9,467,750 B2 | 10/2016 | Banica et al. | |

(Continued)

FOREIGN PATENT DOCUMENTS

| | | |
|---|---|---|
| WO | 2010076769 A1 | 7/2010 |
| WO | 2016026050 A1 | 2/2016 |
| WO | 2016028813 A1 | 2/2016 |

OTHER PUBLICATIONS

"Contextual Marketing: Explore the Strategy of Contextual Marketing", MarketingSchools.org, May 8, 2013.

(Continued)

*Primary Examiner* — Azam A Ansari
(74) *Attorney, Agent, or Firm* — Guntin & Gust, PLC; Dana Lemoine

(57) ABSTRACT

Aspects of the subject disclosure may include, for example, a method that includes obtaining media content, analyzing the media content for an advertisement insertion space, receiving a request for the media content from equipment of a user, obtaining a profile for the user, determining a location of the user, determining a time of a delivery of the media content, determining an advertising insertion for the advertising insertion space based on the profile of the user, the location of the user, and the time of the delivery of the media content, and inserting the advertising insertion into the media content in place of the advertisement insertion space to generate modified media content. Other embodiments are disclosed.

18 Claims, 7 Drawing Sheets

(56) References Cited

U.S. PATENT DOCUMENTS

| | | |
|---|---|---|
| 9,508,080 B2 | 11/2016 | Hoelz et al. |
| 2004/0194123 A1 | 9/2004 | Fredlund et al. |
| 2006/0282319 A1 | 12/2006 | Maggio et al. |
| 2009/0131025 A1* | 5/2009 | Sharma ................. G06Q 20/10 455/414.3 |
| 2010/0257551 A1 | 10/2010 | Sweeney et al. |
| 2012/0057850 A1 | 3/2012 | Klappert et al. |
| 2012/0144417 A1 | 6/2012 | Khader et al. |
| 2015/0007218 A1 | 1/2015 | Neumann et al. |
| 2015/0358664 A1 | 12/2015 | Marcus et al. |
| 2015/0373385 A1 | 12/2015 | Straub et al. |
| 2016/0112729 A1 | 4/2016 | Sayed et al. |
| 2016/0112768 A1 | 4/2016 | Kim et al. |
| 2016/0255395 A1 | 9/2016 | Tandon |

OTHER PUBLICATIONS

Chorianopoulos, Konstantinos et al., "Intelligent user interfaces in the living room: usability design for personalized television applications", Proceedings of the 8th international conference on Intelligent user interfaces, ACM, 2003.

Kubin, Michael, "Programmatic vs. Addressable for Dummies", linkedin.com, Jun. 17, 2015.

Langheinrich, Marc et al., "Unintrusive customization techniques for Web advertising", Computer Networks 31.11, 1999, 1259-1272.

Mei, Tao et al., "Contextual inimage advertising", Proceedings of the 16th ACM international conference on Multimedia., ACM, 2008.

\* cited by examiner

| Object Placement | Properties | Yes (1)/No (0) |
|---|---|---|
| Actionable | Touch Screen | 1 |
| Actionable | Mic | 1 |
| Actionable | Camera | 0 |
| Relevant | Location | 0 |
| Relevant | Time of day | 1 |
| Relevant | User Profile | 1 |
| | | Total = 4 |

TARGETED USER DIGITAL EMBEDDED ADVERTISING

FIELD OF THE DISCLOSURE

The subject disclosure relates to a media content system that modifies images according to viewer information.

BACKGROUND

Media content is conventionally provided to viewers having a preset series of images and sounds. Advertising content is provided in addition to the media content.

BRIEF DESCRIPTION OF THE DRAWINGS

Reference will now be made to the accompanying drawings, which are not necessarily drawn to scale, and wherein:

FIG. 8 depicts an illustrative embodiment of an advertising cost matrix 800.

DETAILED DESCRIPTION

The subject disclosure describes, among other things, illustrative embodiments for modifying images of media content to present directed images for the viewer. Other embodiments are described in the subject disclosure.

One or more aspects of the subject disclosure include a method that includes obtaining media content, analyzing the media content for an advertisement insertion space, receiving a request for the media content from equipment of a user, obtaining a profile for the user, determining a location of the user, determining a time of a delivery of the media content, determining an advertising insertion for the advertising insertion space based on the profile of the user, the location of the user, and the time of the delivery of the media content, and inserting the advertising insertion into the media content in place of the advertisement insertion space to generate modified media content.

One or more aspects of the subject disclosure include a media processor that includes a processing system including a processor and a memory that stores executable instructions that, when executed by the processing system, facilitate performance of operations that includes providing media content from a media server, generating a user profile for a user of the media processor observing the media content, determining a time of day for the providing of the media content, determining a location of the media processor during the providing of the media content, determining if a replaceable placement object is within a frame of the media content, generating a replacement placement object profile for the replaceable placement object in the frame of the media content based on the user profile, the time of day, and the location, obtaining an replacement object based on the replacement object profile, and inserting the replacement object into the frame in place of the replaceable placement object.

One or more aspects of the subject disclosure include a machine-readable storage medium, comprising executable instructions that, when executed by a processing system including a processor, facilitate performance of operations that includes receiving a request for media content from a media processor, obtaining a user profile for a user of the media processor requesting the media content, determining a time of day for the providing of the media content, determining a location of the media processor during the providing of the media content, determining if a replaceable placement object is within a frame of the media content, generating a replacement placement object profile for the replaceable placement object in the frame of the media content based on the user profile, the time of day, and the location, obtaining an replacement object based on the replacement object profile, inserting the replacement object into the frame in place of the replaceable placement object, and providing the media content including the replacement object to the media processor.

Figure 1:
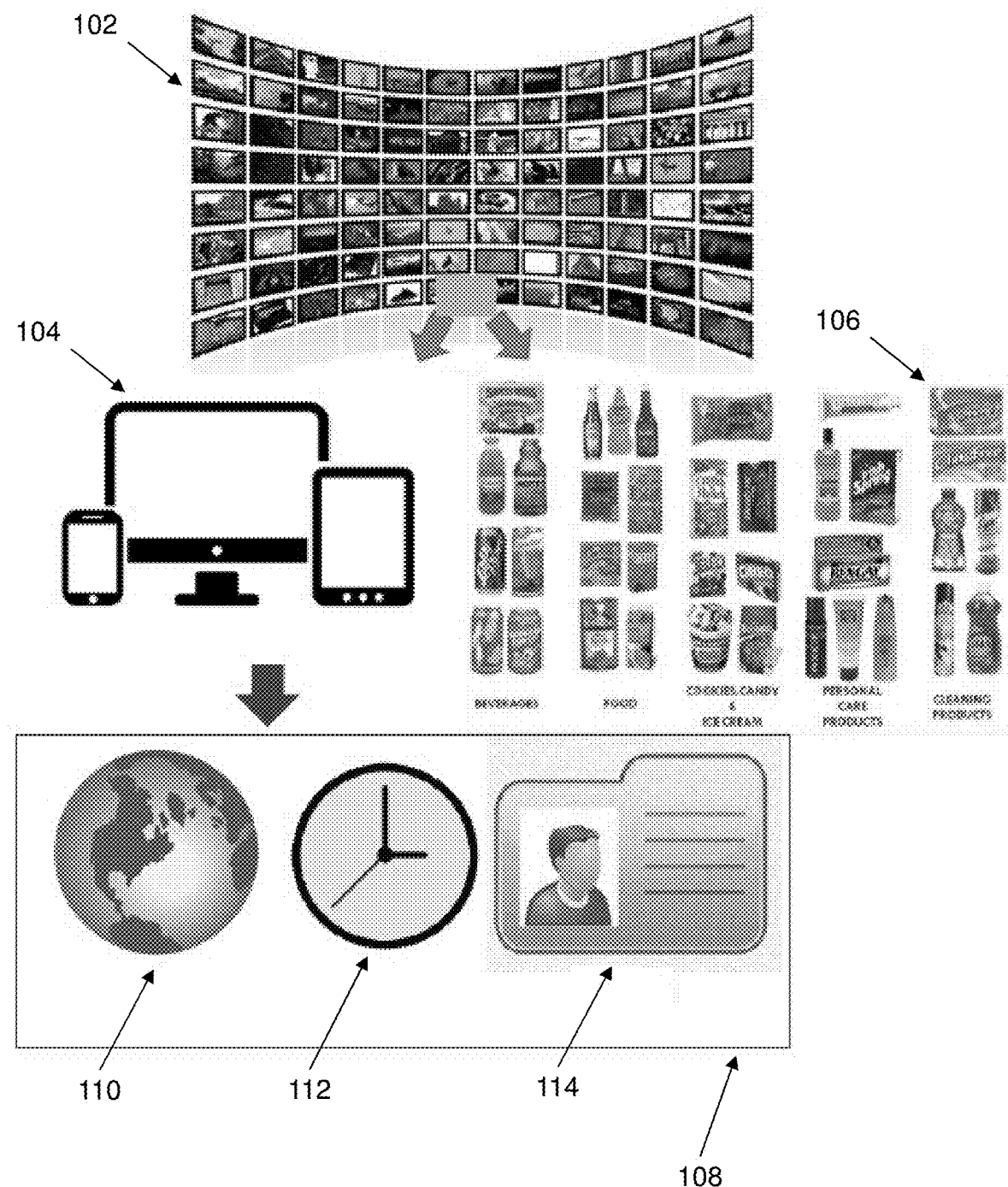
FIG. 1 depicts an illustrative embodiment of system 100.

FIG. 1 depicts an illustrative embodiment of media system 100. Media system 100 can include a media service provider 102. Media service provider 102 can include a broadcast or unicast media delivery service. Exemplarily, media service provider 102 can include media content. Exemplarily, the media content can be provided by the media service provider 102 as an over-the-top (OTT) service to media processors 104. Exemplarily, media processors 104 can include a variety of device that can receive the media content and display that media content on a display device. Media processors 104 can include tablets, smart phones, personal computers, as well as set-top boxes, OTT devices, and smart televisions. In other embodiments, the media service provider 102 can be a broadcast provider as well as a broadcast provider with on-demand capability.

Exemplarily, system 100 can include a system 108 for collecting information about viewers and users of system 100. Exemplarily, a user watches media content from the media service provider 102 through one of his media device from the group of media processors 104. For example, the user can view OTT media content at home on his desktop computer while watching OTT media while traveling on his communications device or smart phone. In addition, the user can view OTT media content over his tablet in another instance.

Exemplarily, the system 108 for collecting information about viewers and user can collect information including a location 110 of the user while the media content is being viewed. In addition, the system 108 can monitor a time of day 112 at which the viewer views the media content. The system 108 can include user profiles 114 for the user. Exemplarily, the user profile 114 information can include information about the devices the user possesses and is currently using of the group of media processors 104. The user profile 114 can include information about the capabilities of the devices being used. For example, these capabilities can include information as to whether the media device includes a touch screen, a microphone, a camera, and a GPS location device. In addition, the user profile 114 can include user preferences, viewing history, product purchase history, and other information such as a record of interactions the user has had with the system.

Exemplarily, the media service provider 102 can interact with a product placement system 106. Exemplarily, the product placement system 106 can include a variety of items that can be inserted into frames of the media content being provided by the media service provider 102 to a media processor of the group of media processors 104 according to the information retrieved by the system 108 for collecting information.

Exemplarily, one of the media service provider 102, the product placement system 106, or the media processors 104 can interrogate frames of the media content to determine which images in the frame can be replaced and/or highlighted. Exemplarily, an object is identified in the frame as one that can be replaced or substituted. For example, a can of soda could be identified and then selected to be replaced with a similar image from the product placement system 106. In one example, a can of soda can be recognized and replaced with another can of soda from a particular advertiser. Exemplarily, the advertiser paid for placement of the image in the product placement system 106 and will be billed accordingly for the product placement. In addition, the choice of which product to be placed in the frame will be made according to the system 108 for collecting information about viewers. For example, the system 108 for collecting information about viewers will choose an item to be replaced and its replacement based on the time or day, the location of the user, and the user's profile.

Exemplarily, an object can be identified in a frame of media content. The identified object can then be removed by manipulating the image in the frame of media content. A replacement object can be placed in the frame in place of the identified object using image manipulation techniques. In some embodiments, an existing image is used while in other embodiments, CGI technology is employed to the properly make the replacement object fit into the frame in place of the identified object. Exemplarily, the replacement object is seamlessly inserted into the frame in place of the identified object although, in some embodiments, additional image manipulation would be employed to subtly highlight the replacement object. The highlight could be a slight halo that would make the replacement object slightly noticeable. In some embodiments, a brightness around the replacement object can be changed. In additional objects, the highlighted replacement object can be combined with touchscreen technology to give the user the option to choose the replacement object so as to receive further communications about that replacement object.

Figure 2:
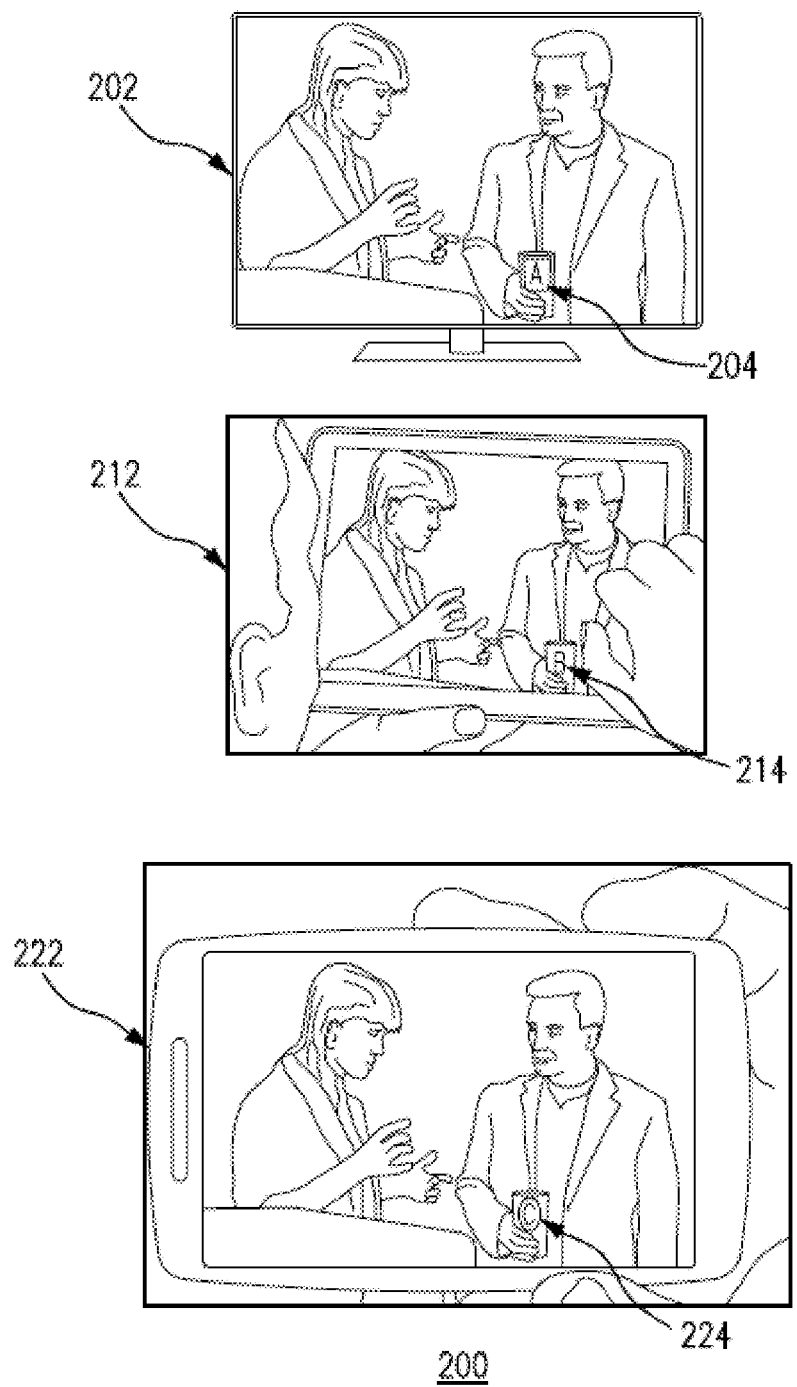
FIG. 2 depicts an illustrative embodiment of system 200.

FIG. 2 depicts an illustrative embodiment of system 200. Exemplarily, system 200 provides a dynamic placement of object replacement advertising in media content. System 200 exemplarily illustrates multiple viewing devices of one user operating with the media service provider 102 of system 100 of FIG. 1. Exemplarily, screens 202, 212, and 222 illustrate different examples of a modified frame of media content that result from different decisions based on the system 108 for collecting information about viewers. In a first example, a viewer is at screen 202, which in this example, is the monitor for a desktop computer. In this example, the viewer may be watching an episode of a TV show with an unmodified product 204 in the frame. In this instance, the product 204 may or may not have been detected but was not replaced at this time.

Next, in the example illustrated for screen 212, product "A" 204 has been replaced by product "B" 214. In this scenario, it is illustrated that screen 212 is from a tablet device. The tablet device is being viewed while the user is travelling. The time while the media content is being viewed is approximately mid-afternoon in a certain geographic location. In this scenario, it is known from the user's profile that he is from West Virginia but is currently viewing the media content in Georgia. Based on the time, location, and user profile information, the product placement system 106 has determined that a different product 214 should replace product 204. In this instance, a different brand of soda than that of product 204 is shown as product 214.

In another example, the same viewer is watching the same media content on screen 222. The user's profile information shows a preference for coffee. In addition, the time information reveals that the media content is being watched in the morning. In this instance, product "C" 224 has been placed in the frame. Product 224 is a nationally known brand of coffee. Generally, the image in the frame is modified for a series of frames to convey a continuous image of the replacement product so that the replacement product is visible. In addition, in some embodiments, the replaced product could be enhanced so as to draw attention to that product. For example, a slight halo around the product could be provided so as to innocuously draw attention to that replaced image.

In other instances, a different, more local coffee brand could be provided depending on the availability of such an advertiser in the product placement system 106. In other examples, different products in the frame could be replaced based on the scenario depicted in the frame. In one example, a necklace on an actress could be replaced based on the user profile information for that viewer and an available jewelry advertising replacement in the product placement system 106. In these scenarios, the system will exemplarily make these determinations based on the user's location, time of day, and the user's profile information.

In addition, in each of the scenarios provided in FIG. 2, the result of providing the replacement content into the frame would lead to revenue from the advertiser for that product. For example, in screen 212, the advertiser for product 214 would be billed while in screen 222, the advertiser for product 224 would be billed. The billing could be affected by the information gathered by the system 108 for collecting information about viewers. In additional embodiments, an advertiser could be charged a different amount for users with touch screen enabled devices. Users with touch screen enabled devices could, for example, tap the screen to gather more information about the replacement content. In some instances, the user could be alerted that more information is available. In other embodiments, the advertiser could be charged other amounts depending on the time of day and location of the user.

FIG. 8 illustrates an advertising cost matrix 800 which could guide the determination of a fee to charge an advertiser for the dynamic placement of object replacement advertising in media content. Referring to FIG. 8, several points are assigned to an object's placement and the properties thereof. For example, in one scenario, a point is awarded because the media processor has a touch screen, a point is awarded because the media processor has a microphone, a point is awarded because the media content is viewed during a certain time of day, and a point is awarded because the media content is being viewed by a user with an appropriate user profile. On the other hand, no points were awarded as no camera is present and a location is not appropriate.

In some examples, content providers may place a score on the product placement depending if the viewer has the ability to act on the object being inserted and how relevant it is to the user. Based on the score, a provider can charge more money to the advertiser, such as $0.01 can be charged for every point accrued across the advertising system. In other embodiments, if there are more than one advertiser that could qualify for product placement, the advertisers could bid to have their object placed in the content. In one such example, if the targeted placement score is 4, a first advertiser may bid up to $0.10 to have its product inserted. However, in the same example, a second advertiser could bid $0.14 for the same score.

Figure 3:
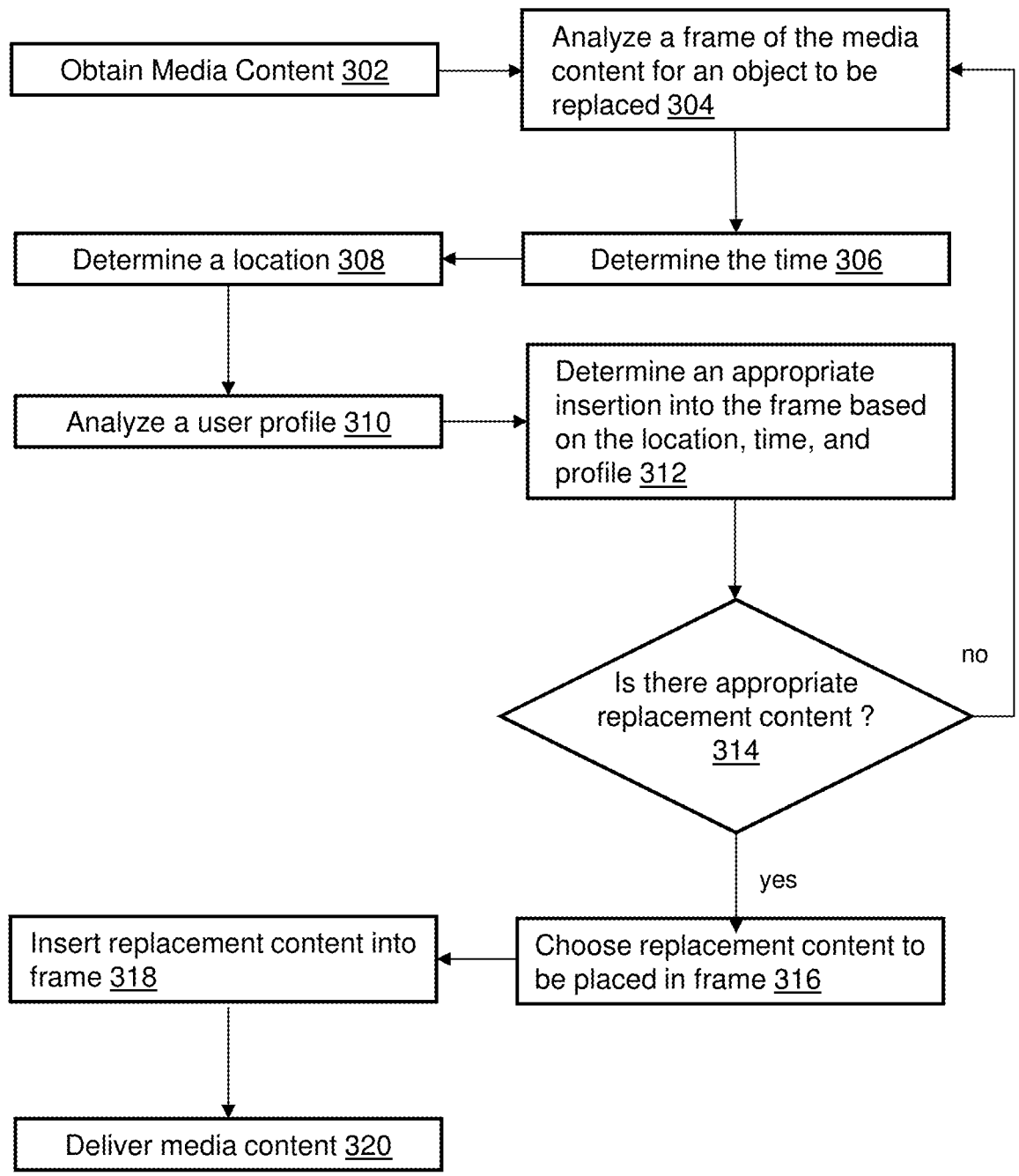
FIG. 3 depicts an illustrative embodiment of a method used in portions of the system described in FIGS. 1 and 2.

FIG. 3 depicts an illustrative embodiment of a method used by the media system 100 in FIG. 1 to perform operations according to the examples illustrated in FIG. 2. Exemplarily, method 300 begins when media content is obtained in Step 302. Exemplarily, the obtaining of media content can occur when a media server prepares the media content for broadcast, when a media processor receives media content from the media server or a satellite distribution system, or when a media processor prepares to display the media content. In some examples, a media processor receives a transmission of the media content through an OTT application. In other instances, a set-top box can receive media content from an interactive television system.

In Step 304, frames of the media content are exemplarily analyzed for objects that can be replaced with replacement content. As described above with FIG. 2, for example, an object such as cup of soda can be identified as an object to be replaced. In some embodiments, more than one object can be identified. Objects that can be identified can include objects that characters in a frame of the video content are manipulating or holding. In other embodiments, the object can be clothing or jewelry worn a character. For example, a character's necklace can be identified to ultimately be replaced by an advertiser's necklace.

In some embodiments, the object in the frame can be checked against other past and upcoming frames in the media content to determine if the object is in continuous view for an acceptable period of time. Accordingly, objects that appear for less than a second of continuous frames may not be appropriate targets for replacement. Exemplarily, potential replacement objects are determined so as to provide options for substitutions in case the time, location, and profile of the user indicate that there is an appropriate object to be replaced in the frame.

In some embodiments, the objects that can be replaced can include blank spaces or areas in a frame in which no character or object resides. For example, a blank wall can be selected to have objects placed thereon. In other examples, empty spaces on furniture can be populated with replacement objects. Exemplarily, a bookcase can be identified. In accordance with this embodiment, once furniture is identified, empty spaces within or on the furniture can be identified as an area for replacement objects to be placed. In another embodiment, a table within a frame can be identified, empty areas on the table can be identified to be populated with replacement objects.

In each of Steps 308, 310, and 312, the location of the media processor that will display the media content, the time at which the media processor will display the media content, and the user profile of the viewer of the media content will be obtained. In some examples, the user profile can be determined based on their activity in an OTT system. In other instances, the user profile can be obtained based on the observed behaviors of the user. In some examples, the user's social media account can be accessed to determine relevant personal details. Exemplarily, each of the time, location, and user profile can form a media content replacement profile for which replacement content can be chosen.

In Step 312, the media content replacement profile can be analyzed against advertising information, as well as other information, to determine which objects in the frame should be replaced along with a determination of what the replacement content should be. As discussed above, the determination can be based on available advertising and on the media content replacement profile for the viewer. Accordingly, if a region has an advertiser for certain products that may appeal to the viewer, then that advertisement replacement content can be selected. In additional embodiments, the advertisement replacement content can be further refined based on the user's profile, the time of day, and the location of the media processor. Accordingly, local advertisers can be represented in OTT video content along with time directed replacement.

In another embodiment, the context of a scene in which the media content can be analyzed for context. That is, the context of the frame being analyzed should be understood within the context of the media content. Exemplarily, the replacement object is selected so as to not conflict or otherwise interfere with the media content. For example, while in some scenarios, replacing a beverage with an alcoholic beverage may not be appropriate when the scene involves a business context or where there are under aged consumption. Similarly, other replacement objects may not be suitable for insertion as it would interfere with the scene. Exemplarily, metadata in the media content can identify a tone or context of the scene. In other embodiments, the context or tone of the scene can be analyzed locally by the media processor as the media content is downloaded, stored, or played.

In Step 314, it is determined whether Step 312 has been successful in finding replacement content for the identified objects in the frame. If there was no suitable candidates for replacement, either because of lack of objects in the frame or no advertising content, then method 300 can return to Step 304 as additional frames will be analyzed. If suitable content has been found, one or more of the replacement content are chosen to be inserted into the frame. Next, in Step 318, the replacement content is inserted into the frame in place of the identified object in the frame. In Step 320, the media content is delivered to the display device or a buffer for viewing.

While for purposes of simplicity of explanation, the respective processes are shown and described as a series of blocks in FIG. 3, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 4:
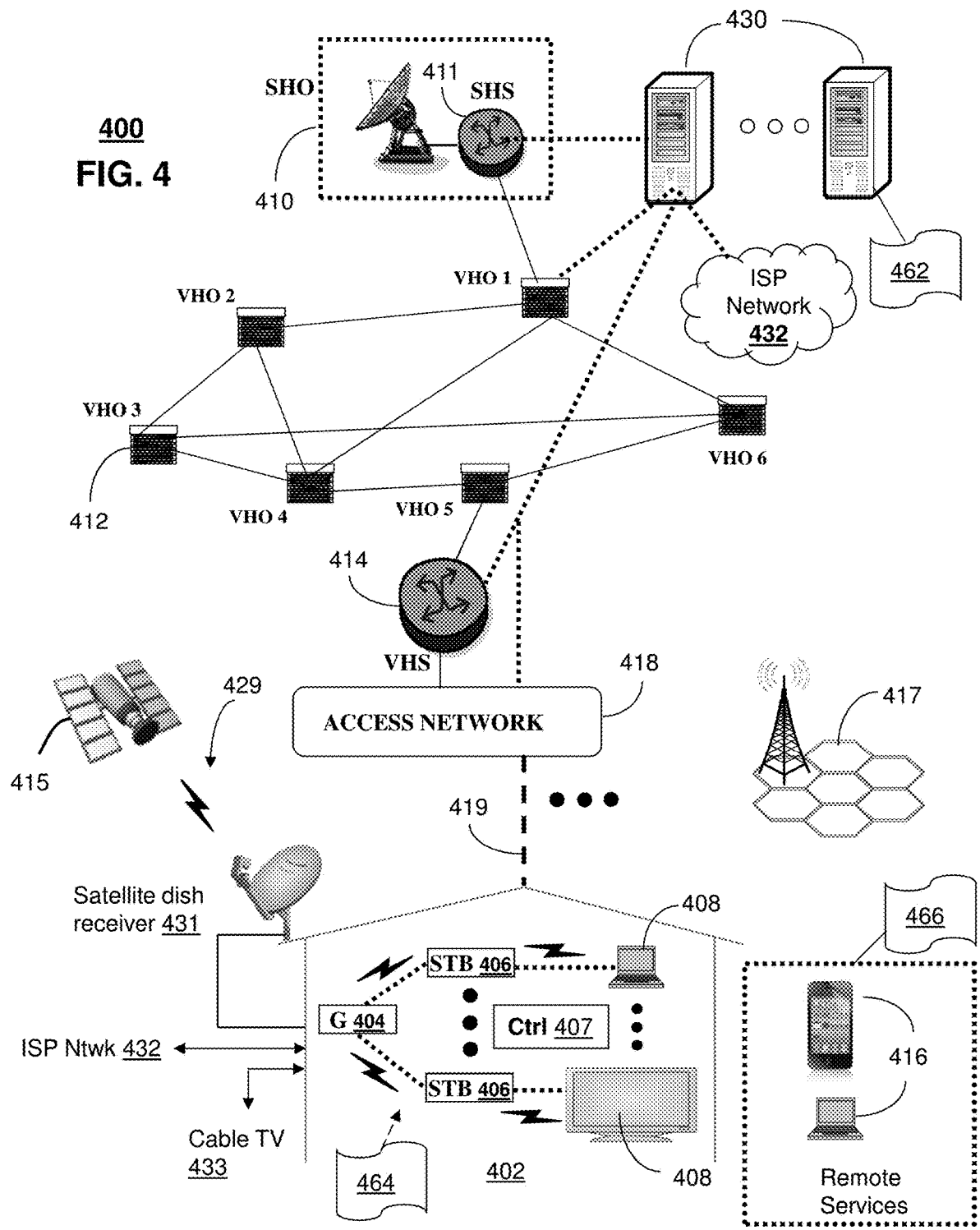
FIG. 4 depicts illustrative embodiments of a communication system that provide media services to the servers and devices of systems 100 and 200.

FIG. 4 depicts an illustrative embodiment of a communication system 400 for providing various communication services, such as delivering media content. The communication system 400 can represent an interactive media network, such as an interactive television system (e.g., an Internet Protocol Television (IPTV) media system). Communication system 400 can be overlaid or operably coupled with media service provider 102 of system 100 in FIG. 1 as another representative embodiment of communication system 400. For instance, one or more devices illustrated in the communication system 400 of FIG. 4 can perform method that includes obtaining media content, analyzing the media content for an advertisement insertion space, receiving a request for the media content from equipment of a user, obtaining a profile for the user, determining a location of the user, determining a time of a delivery of the media content, determining an advertising insertion for the advertising insertion space based on the profile of the user, the location of the user, and the time of the delivery of the media content, and inserting the advertising insertion into the media content in place of the advertisement insertion space to generate modified media content.

In one or more embodiments, the communication system 400 can include a super head-end office (SHO) 410 with at least one super headend office server (SHS) 411 which receives media content from satellite and/or terrestrial communication systems. In the present context, media content can represent, for example, audio content, moving image content such as 2D or 3D videos, video games, virtual reality content, still image content, and combinations thereof. The SHS server 411 can forward packets associated with the media content to one or more video head-end servers (VHS) 414 via a network of video head-end offices (VHO) 412 according to a multicast communication protocol. The VHS 414 can distribute multimedia broadcast content via an access network 418 to commercial and/or residential buildings 402 housing a gateway 404 (such as a residential or commercial gateway).

The access network 418 can represent a group of digital subscriber line access multiplexers (DSLAMs) located in a central office or a service area interface that provide broadband services over fiber optical links or copper twisted pairs 419 to buildings 402. The gateway 404 can use communication technology to distribute broadcast signals to media processors 406 such as Set-Top Boxes (STBs) which in turn present broadcast channels to media devices 408 such as computers or television sets managed in some instances by a media controller 407 (such as an infrared or RF remote controller).

The gateway 404, the media processors 406, and media devices 408 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the media processors 406 and subsystems of the IPTV media system for services such as video-on-demand (VoD), browsing an electronic programming guide (EPG), or other infrastructure services.

A satellite broadcast television system 429 can be used in the media system of FIG. 4. The satellite broadcast television system can be overlaid, operably coupled with, or replace the IPTV system as another representative embodiment of communication system 400. In this embodiment, signals transmitted by a satellite 415 that include media content can be received by a satellite dish receiver 431 coupled to the building 402. Modulated signals received by the satellite dish receiver 431 can be transferred to the media processors 406 for demodulating, decoding, encoding, and/or distributing broadcast channels to the media devices 408. The media processors 406 can be equipped with a broadband port to an Internet Service Provider (ISP) network 432 to enable interactive services such as VoD and EPG as described above.

In yet another embodiment, an analog or digital cable broadcast distribution system such as cable TV system 433 can be overlaid, operably coupled with, or replace the IPTV system and/or the satellite TV system as another representative embodiment of communication system 400. In this embodiment, the cable TV system 433 can also provide Internet, telephony, and interactive media services. System 400 enables various types of interactive television and/or services including IPTV, cable and/or satellite.

The subject disclosure can apply to other present or next generation over-the-air and/or landline media content services system.

Some of the network elements of the IPTV media system can be coupled to one or more computing devices 430, a portion of which can operate as a web server for providing web portal services over the ISP network 432 to wireline media devices 408 or wireless communication devices 416.

Communication system 400 can also provide for all or a portion of the computing devices 430 to function as a media service provider (herein referred to as media server 430). The media server 430 can use computing and communication technology to perform over the top video delivery 462, which can include among other things, the techniques of delivering media content and modifying that content described by method 300 of FIG. 3. For instance, over the top video delivery 462 of server 430 can be similar to the functions described for media service provider 102 of FIG. 1 in accordance with method 300 of FIG. 3. The media processors 406 and wireless communication devices 416 can be provisioned with software functions 464 and 466, respectively, to utilize the services of media server 430. For instance, functions 464 and 466 of media processors 406 and wireless communication devices 416 can be similar to the functions described for the communication devices 104 of FIG. 1 and screens 202, 212, and 222 of FIG. 2 in accordance with method 300 where, for example, the frames are analyzed for objects to be replaced in Step 304 of FIG. 3.

Multiple forms of media services can be offered to media devices over landline technologies such as those described above. Additionally, media services can be offered to media devices by way of a wireless access base station 417 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 5:
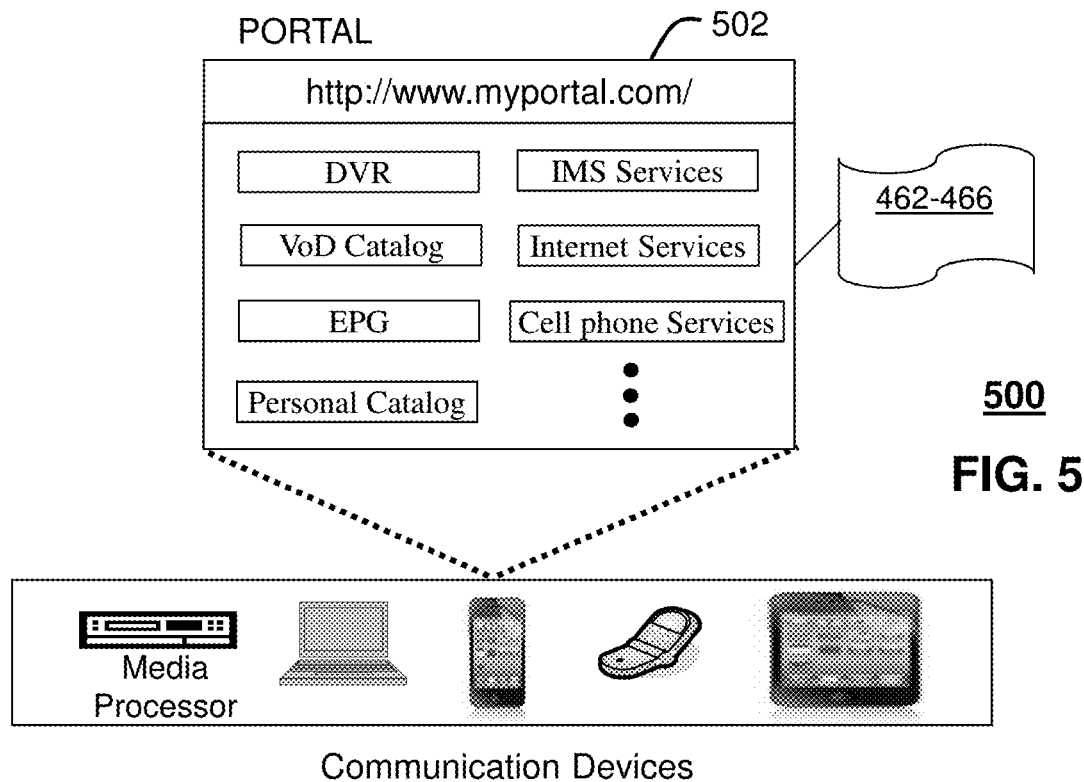
FIG. 5 depicts an illustrative embodiment of a web portal for interacting with the communication systems of systems 100 and 200.

FIG. 5 depicts an illustrative embodiment of a web portal 502 of a communication system 500. Communication system 500 can be overlaid or operably coupled with media service provider 102 of FIG. 1 and communication system 400 as another representative embodiment of system 100 of FIG. 1 and communication system 400. The web portal 502 can be used for managing services of media service provider 102 of FIG. 1 and communication systems 400. A web page of the web portal 502 can be accessed by a Uniform Resource Locator (URL) with an Internet browser using an Internet-capable communication device such as those described in FIG. 1 and FIG. 4. The web portal 502 can be configured, for example, to access a media processor 406 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 406. The web portal 502 can also be used for provisioning IMS services described earlier, provisioning Internet services, provisioning cellular phone services, and so on.

The web portal 502 can further be utilized to manage and provision software applications 464 and 466 to adapt these applications as may be desired by subscribers and/or service providers of the media service provider 102 of FIG. 1 and communication system 400. For instance, users of the media service can log into their on-line accounts and provision the servers 102 or server 430 with to further define their preferences with their OTT application or video delivery service as well as to enquire about further information of any advertising that was displayed, and so on. Service providers can log onto an administrator account to provision, monitor and/or maintain the media service provider 102 of FIG. 1 or server 430.

Figure 6:
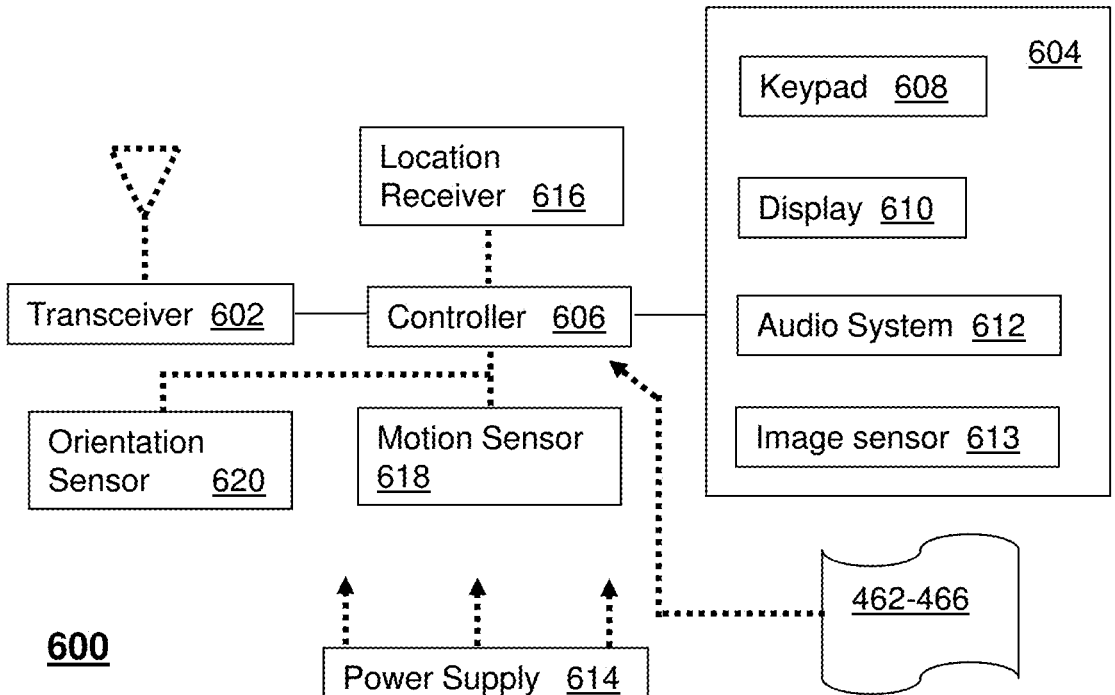
FIG. 6 depicts an illustrative embodiment of a communication device.

FIG. 6 depicts an illustrative embodiment of a communication device 600. Communication device 600 can serve in whole or in part as an illustrative embodiment of the devices depicted in FIG. 1 and FIG. 4 and can be configured to perform portions of method 300 of FIG. 3.

Communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface with graphical user interface (GUI) elements that can be selected by a user with a touch of a finger. The touch screen display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable applications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a reset button (not shown). The reset button can be used to reset the controller 606 of the communication device 600. In yet another embodiment, the communication device 600 can also include a factory default setting button positioned, for example, below a small hole in a housing assembly of the communication device 600 to force the communication device 600 to re-establish factory settings. In this embodiment, a user can use a protruding object such as a pen or paper clip tip to reach into the hole and depress the default setting button. The communication device 600 can also include a slot for adding or removing an identity module such as a Subscriber Identity Module (SIM) card. SIM cards can be used for identifying subscriber services, executing programs, storing subscriber data, and so forth.

The communication device 600 as described herein can operate with more or less of the circuit components shown in FIG. 6. These variant embodiments can be used in one or more embodiments of the subject disclosure.

The communication device 600 can be adapted to perform the functions of communication devices 104 of FIG. 1 and screens 202, 212, and 222 of FIG. 2, the media processor 406, the media devices 408, or the portable communication devices 416 of FIG. 4. It will be appreciated that the communication device 600 can also represent other devices that can operate in system 100 of FIG. 1 and communication system 400 of FIG. 4 such as a gaming console, a dedicated OTT application or device, and a media player. In addition, the controller 606 can be adapted in various embodiments to perform the functions 464 and 466, respectively.

Upon reviewing the aforementioned embodiments, it would be evident to an artisan with ordinary skill in the art that said embodiments can be modified, reduced, or enhanced without departing from the scope of the claims described below. For example, other relevant data observed by the media processor about the viewer can be introduced into the decision of which advertising replacement content can be placed in a frame. In some instances, recent social media updates or Internet searched can be analyzed to provide guidance for choosing the advertising replacement content. In some embodiments, the speed at which the media processor is moving can be introduced as a factor. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 7:
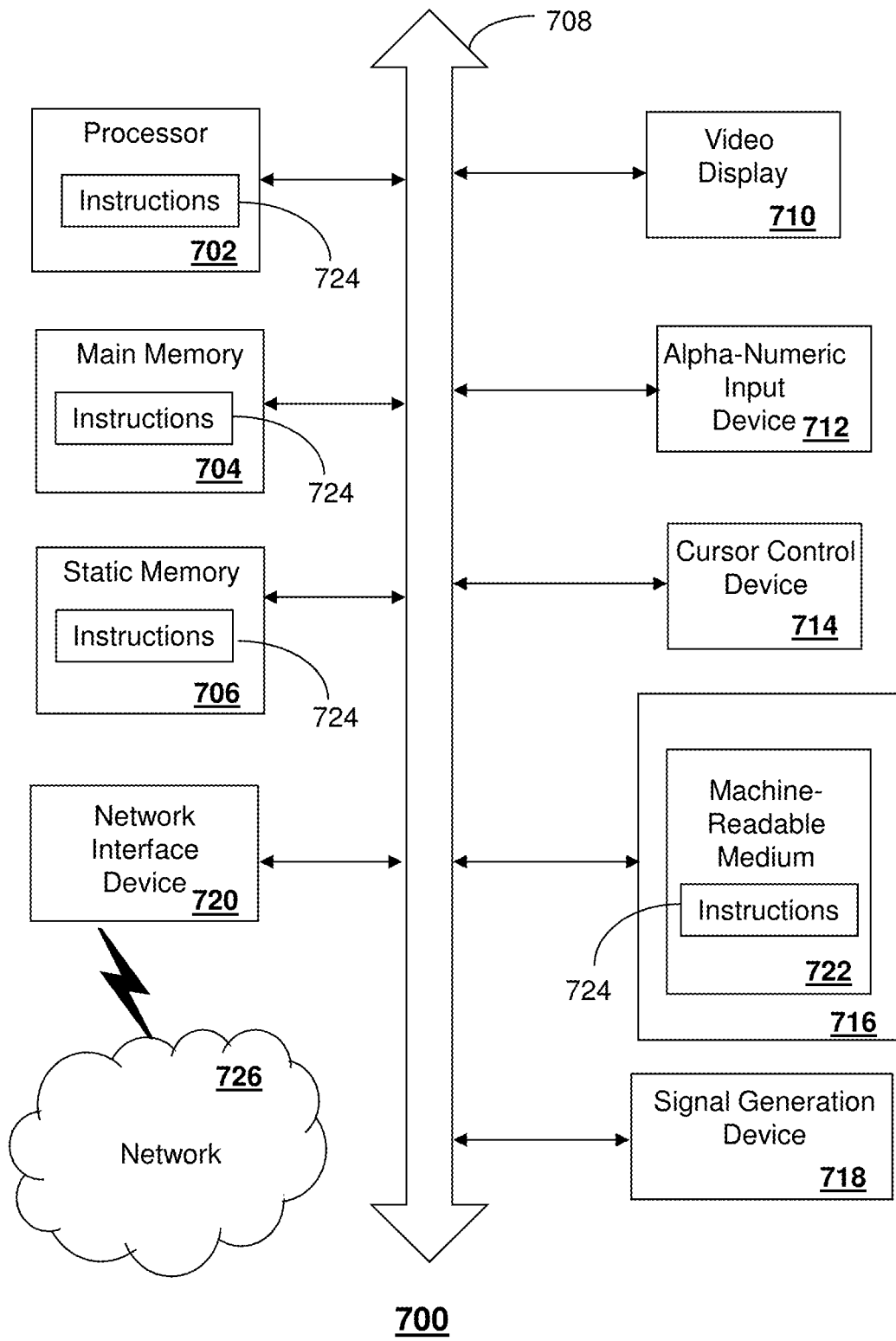
FIG. 7 is a diagrammatic representation of a machine in the form of a computer system within which a set of instructions, when executed, may cause the machine to perform any one or more of the methods described herein.

FIG. 7 depicts an exemplary diagrammatic representation of a machine in the form of a computer system 700 within which a set of instructions, when executed, may cause the machine to perform any one or more of the methods described above. One or more instances of the machine can operate, for example, as the media server 430, the media processor 406, the media processors 104 of FIG. 1 and devices as illustrated as screens 202, 212, and 222 of FIG. In some embodiments, the machine may be connected (e.g., using a network 726) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 700 may include a processor (or controller) 702 (e.g., a central processing unit (CPU)), a graphics processing unit (GPU, or both), a main memory 704 and a static memory 706, which communicate with each other via a bus 708. The computer system 700 may further include a display unit 710 (e.g., a liquid crystal display (LCD), a flat panel, or a solid state display). The computer system 700 may include an input device 712 (e.g., a keyboard), a cursor control device 714 (e.g., a mouse), a disk drive unit 716, a signal generation device 718 (e.g., a speaker or remote control) and a network interface device 720. In distributed environments, the embodiments described in the subject disclosure can be adapted to utilize multiple display units 710 controlled by two or more computer systems 700. In this configuration, presentations described by the subject disclosure may in part be shown in a first of the display units 710, while the remaining portion is presented in a second of the display units 710.

The disk drive unit 716 may include a tangible computer-readable storage medium 722 on which is stored one or more sets of instructions (e.g., software 724) embodying any one or more of the methods or functions described herein, including those methods illustrated above. The instructions 724 may also reside, completely or at least partially, within the main memory 704, the static memory 706, and/or within the processor 702 during execution thereof by the computer system 700. The main memory 704 and the processor 702 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. Distributed processing environments can include multiple processors in a single machine, single processors in multiple machines, and/or multiple processors in multiple machines. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 722 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 700. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising:
    obtaining, by a processing system comprising a processor, video content;
    analyzing, by the processing system, the video content to identify a replaceable object in a scene of the video content;
    receiving, by the processing system, a request for the video content from equipment of a user;
    obtaining, by the processing system, a profile of the user;
    determining, by the processing system, a current location of the user;
    determining, by the processing system, a time of a delivery of the video content;
    determining, by the processing system, a replacement object for the replaceable object, the determining being based on the profile of the user, the current location of the user, and the time of the delivery of the video content;
    inserting, by the processing system, the replacement object in place of the replaceable object in a plurality of frames of the scene, the inserting the replacement object causing substitution of the replacement object for the replaceable object in the plurality of frames of the scene, to generate modified video content;
    receiving a request for further information about the replacement object, wherein additional information about the replacement object is provided to the equipment of the user responsive to the request for further information;
    generating a score for the video content requested by the equipment of the user, wherein the score is increased based on attributes of the equipment of the user, the profile of the user, the current location of the user, or the time of the delivery of the video content, and wherein the score is increased based on attributes of the equipment when the attributes of the equipment include a touchscreen; and
    adjusting a bill for providing the replacement object into the video content based on the score;
    linkage between points and specific elements (profile, attributes), wherein the attributes include the equipment.

2. The method of claim 1, further comprising delivering the modified video content to the equipment of the user.

3. The method of claim 2, wherein the replacement object is highlighted within a frame of the plurality of frames of the scene.

4. The method of claim 2, further comprising determining a context of the scene.

5. The method of claim 4, wherein the determining the replacement object is consistent with the context of the scene.

6. The method of claim 2, wherein the determining the replacement object comprises searching the profile of the user to determine a user-relevant version of the replacement object based on a purchasing history.

7. The method of claim 1 wherein the profile of the user includes information describing whether the equipment of the user includes a touchscreen.

8. The method of claim 1 wherein the profile of the user includes information describing whether the equipment of the user includes a microphone.

9. The method of claim 1 wherein the profile of the user includes information describing whether the equipment of the user includes a camera.

10. A media processor, comprising:
    a processing system including a processor; and
    a memory that stores executable instructions that, when executed by the processing system, facilitate performance of operations, comprising:
    receiving video content from a media server;
    analyzing the video content to identify a replaceable object in a scene of the video content;
    obtaining a user profile of a user of the media processor observing the video content;
    determining a time of day for the receiving of the video content;
    determining a current location of the media processor during the receiving of the video content;
    determining a replacement object for the replaceable object in the scene of the video content, the determining being based on the user profile, the time of day, and the current location of the media processor;
    inserting the replacement object in place of the replaceable object in a plurality of frames of the scene, the inserting the replacement object causing a substitution of the replacement object for the replaceable object in the plurality of frames of the scene;
    receiving a request for further information about the replacement object;
    providing the request to the media server;
    receiving additional information about the replacement object;
    providing the additional information to the user of the media processor;
    generating a score for the video content received from the media server, wherein the score is increased based on attributes of the media processor, the profile of the user, the current location of the media processor, or the time of day for the receiving of the video content; and wherein the score is increased based on attributes of the media processor when the attributes of the media processor include a microphone; and
    adjusting a bill for providing the replacement object into the video content based on the score.

11. The media processor of claim 10, wherein the replacement object is highlighted within a frame of the plurality of frames of the scene.

12. The media processor of claim 10, wherein the operations further comprise determining a context of the scene.

13. The media processor of claim 12, wherein the determining the replacement object is consistent with the context of the scene.

14. The media processor of claim 10, wherein the operations further comprise generating a replacement object profile for the replaceable object, wherein the generating the replacement object profile comprises searching the user profile to determine a user-relevant version of the replacement object based on a purchasing history.

15. A non-transitory, machine-readable storage medium, comprising executable instructions that, when executed by a processing system including a processor, facilitate performance of operations, comprising:

receiving a request for video content from a media processor;

analyzing the video content to identify a replaceable object in a scene of the video content;

obtaining a user profile for a user of the media processor requesting the video content;

determining a time of day for the request of the video content;

determining a current location of the media processor for the request of the video content;

determining a replacement object for the replaceable object in the scene of the video content based on the user profile, the time of day, and the current location of the media processor;

inserting the replacement object in place of the replaceable object in a plurality of frames of the scene, the inserting the replacement object causing a substitution of the replacement object for the replaceable object in the plurality of frames of the scene;

providing the video content including the replacement object to the media processor;

receiving a request for further information about the replacement object;

providing the request to an advertising server;

receiving additional information about the replacement object from the advertising server; and providing the additional information to the user of the media processor;

generating a score for the video content requested by the media processor, wherein the score is increased based on attributes of the media processor, the user profile, the current location of the media processor, or the time of day, and wherein the score is increased based on attributes of the media processor when the attributes of the media processor include a camera; and adjusting a bill for providing the replacement object into the video content based on the score.

16. The non-transitory, machine-readable storage medium of claim 15, wherein the replacement object is highlighted within a frame of the plurality of frames of the scene.

17. The non-transitory, machine-readable storage medium of claim 15, wherein the operations further comprise:

determining a context of the scene; and determining the replacement object is consistent with the context of the scene.

18. The non-transitory, machine-readable storage medium of claim 15, wherein the operations further comprise receiving device information regarding the media processor.

* * * * *